United States Patent
Sasaki et al.

(10) Patent No.: US 10,808,092 B2
(45) Date of Patent: Oct. 20, 2020

(54) METHOD FOR IMPARTING HEAT SEALABILITY TO A BIAXIALLY ORIENTED POLYESTER FILM, AND METHOD FOR PRODUCING A PACKAGING CONTAINER

(71) Applicant: TOPPAN PRINTING CO., LTD., Taito-ku (JP)

(72) Inventors: Noriyuki Sasaki, Taito-ku (JP); Shunsuke Yajima, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 813 days.

(21) Appl. No.: 15/366,329

(22) Filed: Dec. 1, 2016

(65) Prior Publication Data

US 2017/0081490 A1 Mar. 23, 2017

Related U.S. Application Data

(63) Continuation of application No. PCT/JP2015/002944, filed on Jun. 11, 2015.

(30) Foreign Application Priority Data

Jun. 12, 2014 (JP) ................. 2014-121672
Sep. 5, 2014 (JP) ................. 2014-181344

(Continued)

(51) Int. Cl.
*B32B 15/20* (2006.01)
*C08J 7/12* (2006.01)
(Continued)

(52) U.S. Cl.
CPC ........... *C08J 7/123* (2013.01); *B23K 26/0006* (2013.01); *B23K 26/0622* (2015.10);
(Continued)

(58) Field of Classification Search
CPC .... C08J 7/123; B23K 26/0622; B23K 26/352; B23K 26/0006; B32B 15/20; B32B 27/36; B65D 65/02
See application file for complete search history.

(56) References Cited

U.S. PATENT DOCUMENTS 4,375,494 A * 3/1983 Stokes .................. B32B 27/08
428/323
4,631,155 A 12/1986 Caines
(Continued)

FOREIGN PATENT DOCUMENTS

EP 0287216 A1 * 10/1988 ............. B29C 59/16
JP 63-308042 A 12/1988
(Continued)

OTHER PUBLICATIONS

International Search Report dated Sep. 15, 2015 in PCT/JP2015/002944, filed Jun. 11, 2015.
Extended European Search Report dated Nov. 8, 2017 in Patent Application No. 15805886.7.

*Primary Examiner* — Daniel McNally
(74) *Attorney, Agent, or Firm* — Oblon, McClelland, Maier & Neustadt, L.L.P.

(57) ABSTRACT

A method of imparting heat sealability includes applying a laser beam to a region on a surface of a film while scanning the region with the laser beam such that heat sealability is imparted to the region. The film is a single layer of a biaxially oriented polyester or a laminate having a biaxially oriented polyester layer on one or more surfaces.

20 Claims, 12 Drawing Sheets

(30) Foreign Application Priority Data

Feb. 13, 2015 (JP) ................................ 2015-026632
Apr. 14, 2015 (JP) ................................ 2015-082606

(51) Int. Cl.
 *B32B 15/09* (2006.01)
 *B32B 27/36* (2006.01)
 *B65D 65/02* (2006.01)
 *B23K 26/0622* (2014.01)
 *B23K 26/352* (2014.01)
 *B23K 26/00* (2014.01)
 *B23K 103/00* (2006.01)
 *B23K 103/16* (2006.01)

(52) U.S. Cl.
 CPC ............ *B23K 26/352* (2015.10); *B32B 15/09* (2013.01); *B32B 15/20* (2013.01); *B32B 27/36* (2013.01); *B65D 65/02* (2013.01); *B23K 2103/172* (2018.08); *B23K 2103/42* (2018.08); *B32B 2307/31* (2013.01); *B32B 2307/518* (2013.01); *B32B 2307/54* (2013.01); *B32B 2439/00* (2013.01); *C08J 2367/02* (2013.01)

(56) References Cited

U.S. PATENT DOCUMENTS

| | | | |
|---|---|---|---|
| 4,879,176 A | | 11/1989 | Ouderkirk et al. |
| 4,894,107 A | * | 1/1990 | Tse ...................... B29C 61/0616 156/229 |
| 5,204,181 A | * | 4/1993 | Suzuki .................... B32B 15/08 428/349 |
| 5,529,813 A | * | 6/1996 | Kobsa ................ B23K 26/0604 427/517 |
| 5,721,028 A | | 2/1998 | Suzuki et al. |
| 8,945,702 B2 | * | 2/2015 | Wuest .................... B32B 27/28 156/230 |
| 2003/0215611 A1 | * | 11/2003 | Seth ...................... A61K 9/7023 428/169 |

FOREIGN PATENT DOCUMENTS

| | | |
|---|---|---|
| JP | 04-026339 B | 5/1992 |
| JP | 10-139900 A | 5/1998 |
| JP | 2001-047561 A | 2/2001 |

\* cited by examiner

A–A'

B-B'

E-E'

US 10,808,092 B2

METHOD FOR IMPARTING HEAT SEALABILITY TO A BIAXIALLY ORIENTED POLYESTER FILM, AND METHOD FOR PRODUCING A PACKAGING CONTAINER

CROSS-REFERENCE TO RELATED APPLICATIONS

The present application is a continuation of International Application No. PCT/JP2015/002944, filed Jun. 11, 2015, which claims the benefits of priority to Japanese Application No. 2014-121672, filed Jun. 12, 2014, Japanese Application No. 2014-181344, filed Sep. 5, 2014, Japanese Application No. 2015-026632, filed Feb. 13, 2015, and Japanese Application No. 2015-082606, filed Apr. 14, 2015. The entire contents of all of the above applications are incorporated herein by reference.

BACKGROUND OF THE INVENTION

Field of the Invention

This invention relates to a method for imparting heat sealability by surface treatment of a biaxially oriented polyester film or the like, and also to a method for producing a packaging container using the same.

Discussion of the Background

Biaxially oriented films including a biaxially oriented polyethylene terephthalate film are excellent in strength, heat resistance, dimensional stability, chemical resistance and aroma retaining properties and are thus useful as a variety of packaging materials. Accordingly, packaging bodies, such as a flexible pouch, formed by heat sealing of such films as mentioned above have been expected.

Oriented films are poor in heat sealability. To cope with this, PTL 1 describes a method of imparting heat sealability by irradiating short pulses of an electromagnetic wave on the surface of a biaxially oriented polyester film to modify the surface.

PTL 1: JP-B-H04-026339

SUMMARY OF THE INVENTION

According to one aspect of the present invention, a method of imparting heat sealability includes applying a laser beam to a region on a surface of a film while scanning the region with the laser beam such that heat sealability is imparted to the region. The film is a single layer of a biaxially oriented polyester or a laminate having a biaxially oriented polyester layer on one or more surfaces.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
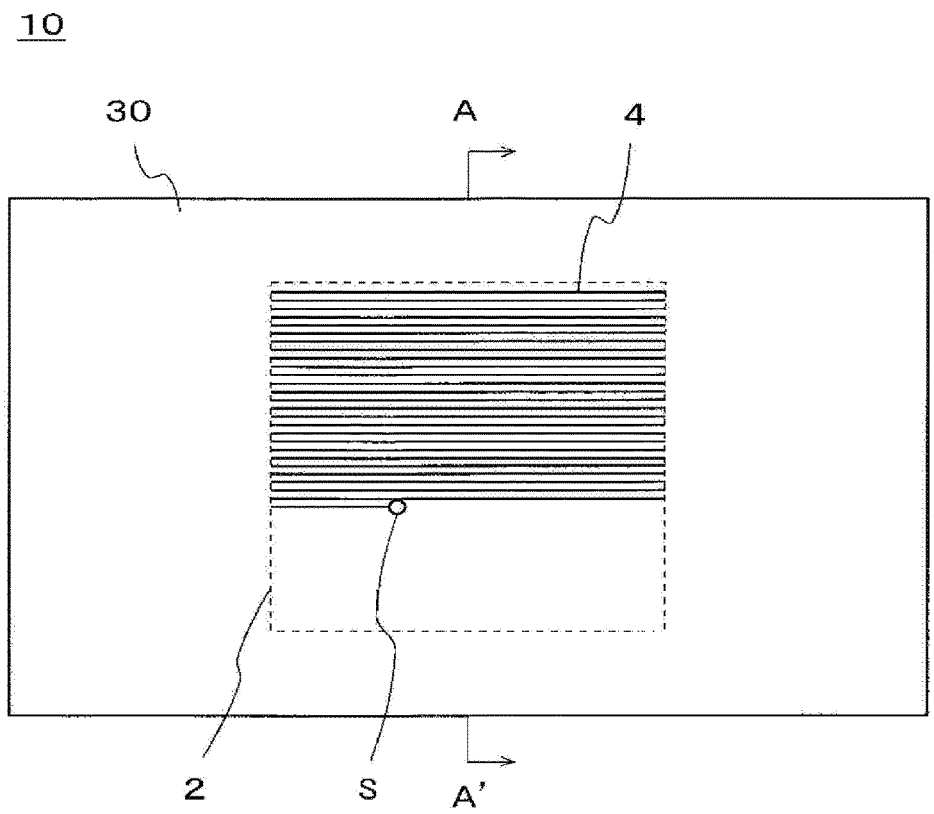
FIG. 1 is a plan view and a sectional view showing a method for imparting heat sealability according to an embodiment.
Figure 1:
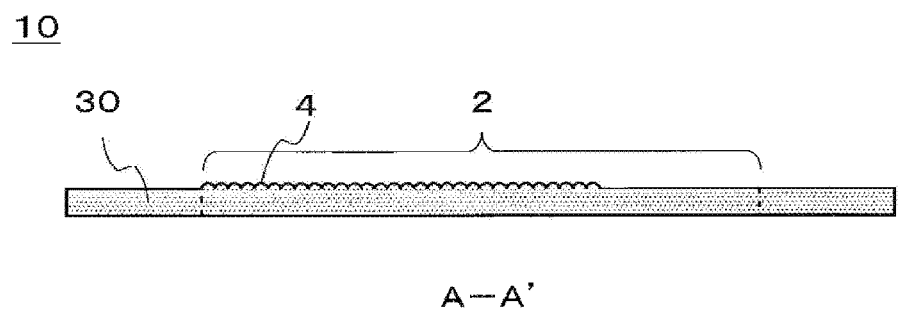

The embodiments will now be described with reference to the accompanying drawings, wherein like reference numerals designate corresponding or identical elements throughout the various drawings.

A method for imparting heat sealability to a biaxially oriented polyester film and a method for producing a packaging container using the same according to embodiments of the invention are described. These methods can be applied to either a film made of a single, biaxially oriented polyester layer or a film made of a laminate including as its surface a biaxially oriented polyester layer. The biaxially oriented polyester is, for example, biaxially oriented polyethylene terephthalate although not limited thereto. The method may be applied to a film having a layer of other type of thermoplastic resin in place of the biaxially oriented polyester layer.

First Embodiment

FIG. 1 is a view illustrating a method related to a first embodiment. In FIG. 1, there are shown a plan view of a film 10 made of a single layer 30 of biaxially oriented polyethylene terephthalate (hereinafter referred to as PET layer 30) as an example of a biaxially oriented polyester film and also a sectional view taken along the A-A' line of the plan view. Where heat sealability is imparted to a region 2 that is a part of the surface of the film 10, a laser beam is successively irradiated on the respective positions of the region 2 by irradiating while scanning the laser beam within the region 2. In the instance of FIG. 1, an irradiation spot S of a laser beam is so irradiated as to draw a plurality of parallel linear traces having a given interval. The laser beam is preferably a carbon dioxide laser beam that has an infrared wavelength whose energy is likely to be efficiently absorbed in the film 10.

The surface portions of the film 10 irradiated with the laser beam are changed in quality due to the transient melting with the laser beam energy. Moreover, the flatness is lost depending, for example, on the irradiation traces thereby forming a microstructure 4 having depressed or protruded portions. In the example shown in FIG. 1, the microstructure 4 is such that a plurality of linear protrusions are formed parallel at a given interval. However, although depending on the output power of a laser beam, an energy density within the irradiation spot, the shape of a scanning trace, a scanning speed and the like, the microstructure 4 may take a variety of forms. The microstructure 4 might not be formed in rare cases. Additionally, the irradiated portions might undergo, for example, whitening along with the formation of the microstructure 4 or in place of the formation of the microstructure 4, with the possibility that the reflectance of light becomes great.

Figure 2:
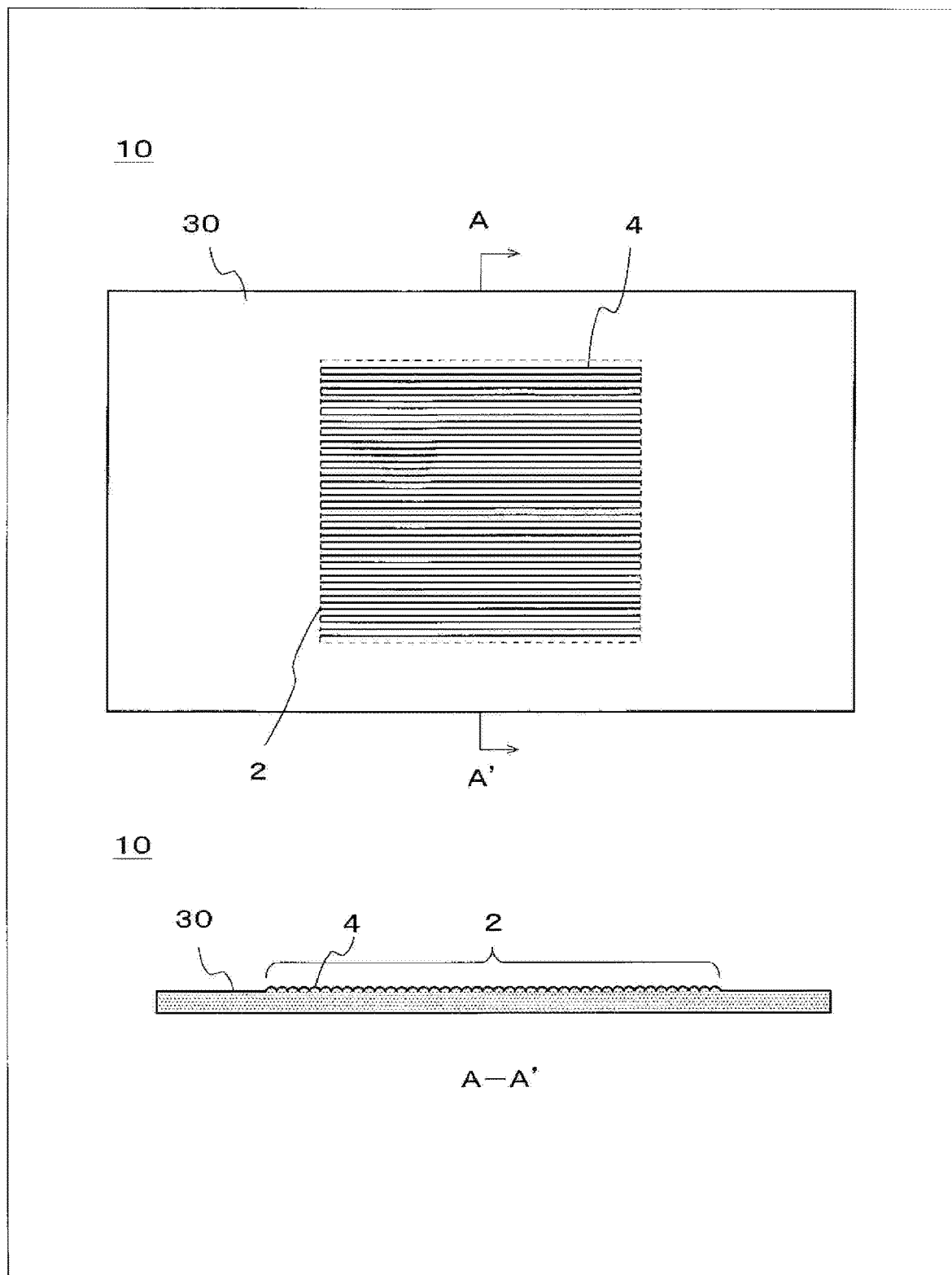
FIG. 2 is a plan view and a sectional view showing a produced film.

Heat sealability is developed at the portions irradiated with a laser beam by the quality change. The quality change is considered to result, for example, from at least a partial lowering or a disappearance of molecular orientation properties such as the degree of crystallinity of the film 10. Additionally, there is considered the possibility that other factors take part in the quality change. When the entire region 2 is subjected to scanning irradiation, the impartment of the heat sealability to the region 2 is accomplished. In FIG. 2, there are shown a plan view and a sectional view of the film 10 after completion of the impartment of the heat sealability.

The type, output power, irradiation spot diameter, scanning trace and scanning speed of laser beam can be appropriately set so as to favorably enable the development of heat sealability depending on the type of material for the film 10.

According to the method, since a laser beam having a given output power is continuously irradiated, the energy efficiency can be made higher and safety can be more likely to be secured than with the case that high power short pulses are irradiated. For instance, practical application of packages formed by mutual heat sealing of polyester films can be facilitated.

In one instance, the PET layer 30 can be favorably imparted with heat sealability when a biaxially oriented polyester film satisfying any of the following requirements (1) to (4) is used.

(1) The melting point measured based on JIS K 7121 is not less than 225° C. to not larger than 270° C.

(2) The thermal shrinkage percentage (150° C., 30 minutes) in the machine direction (MD) measured based on JIS C2151 is not less than 0.5% to not larger than 2.0%.

(3) The total of Young's modulus in the machine direction (MD) measured based on ASTM D882-64T and Young's modulus in the transverse direction (TD) perpendicular to the machine direction is not less than 8 GPa to not larger than 12 GPa.

(4) The total of the breaking strength in the machine direction (MD) measured based on JIS C2151 and the breaking strength in the transverse direction (TD) perpendicular to the machine direction is not larger than 200 MPa to not larger than 540 MPa.

The type, irradiation energy, irradiation spot diameter, scanning trace and scanning speed of laser beam can be appropriately set so as to favorably enable the development of heat sealability depending on the type of material for the PET layer 30. One instance of preferred conditions capable of developing heat sealability is such that an irradiation energy (density) of a laser beam is not less than 2 $J/cm^2$ to not larger than 15 $J/cm^2$.

The irradiation of a laser beam may be carried out by superposing pulse irradiations in place of continuous irradiation. In this case, the irradiation energies of the respective pulses are preferably not less than 0.1 J to not larger than 1 J, for example. Alternatively, the pulse speed (frequency) is preferably not less than 1000 pulses/second to not larger than 500000 pulses/second, for example. Within such a range as defined above, the energy irradiation can be stably and satisfactorily carried out using an ordinary carbon dioxide laser device.

Figure 3A:
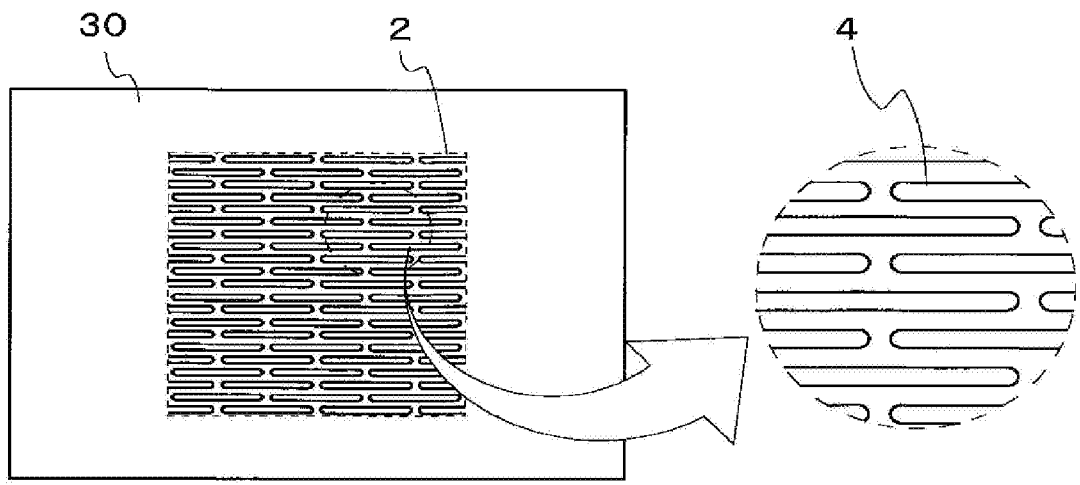
FIGS. 3(a)-3(c) are plan views showing modifications of microstructure.
Figure 3B:
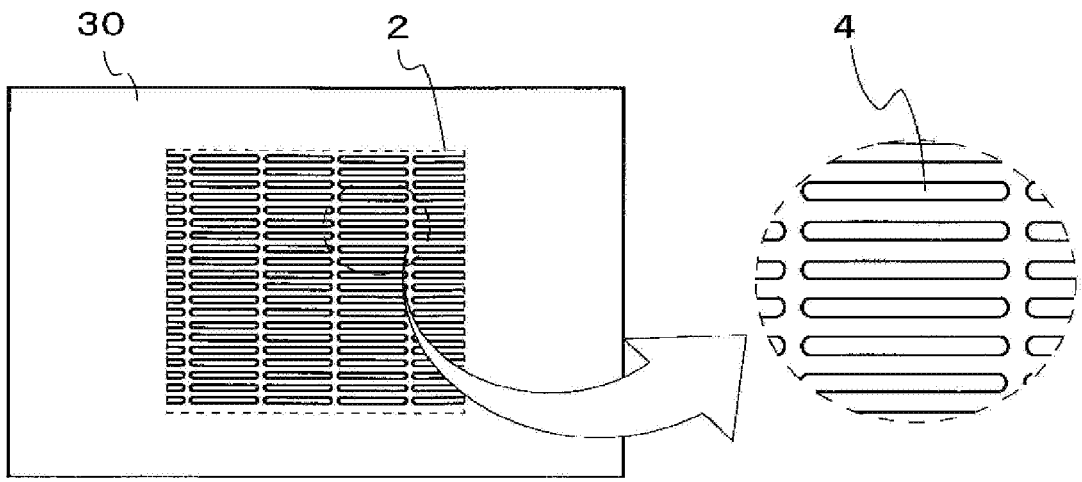
Figure 3C:
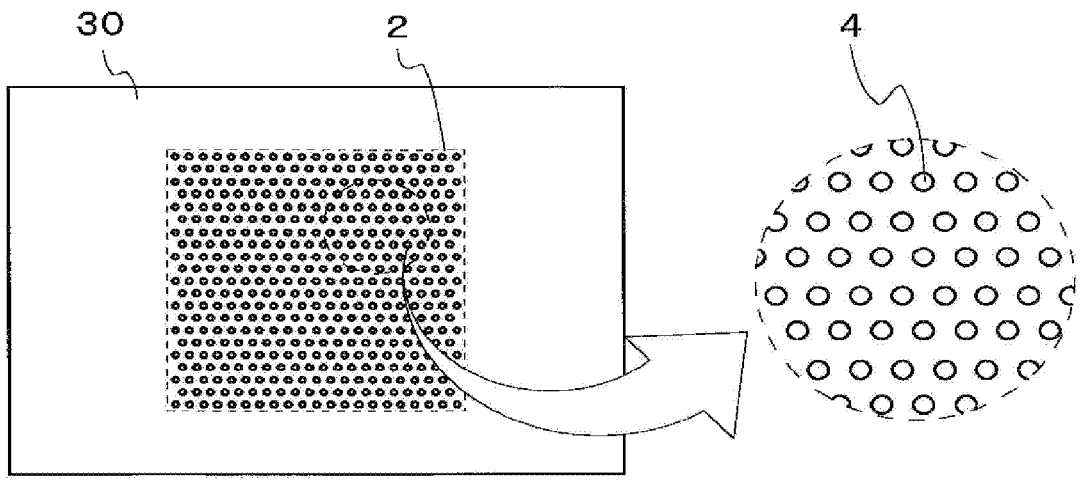
Figure 4A:
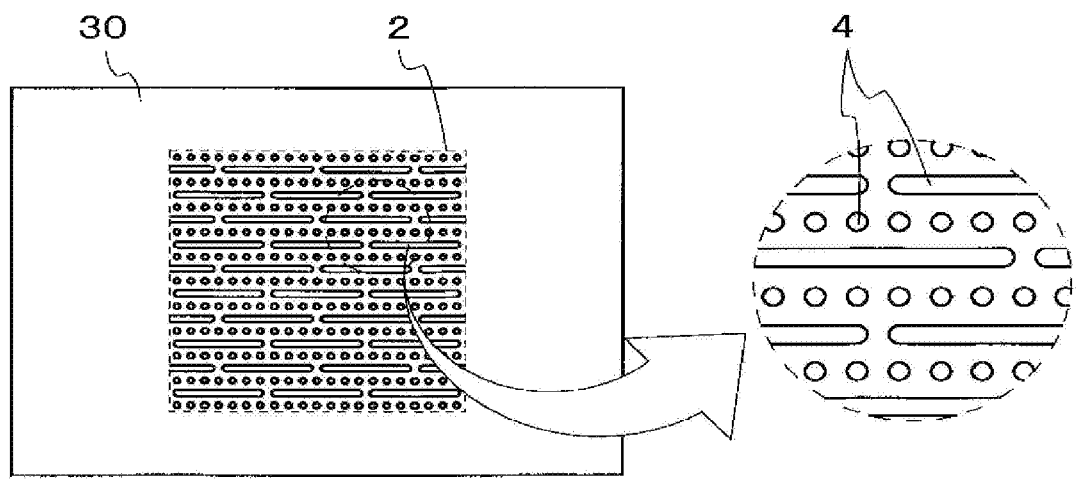
FIGS. 4(a) and 4(b) are plan views showing other modifications of microstructure.
Figure 4B:
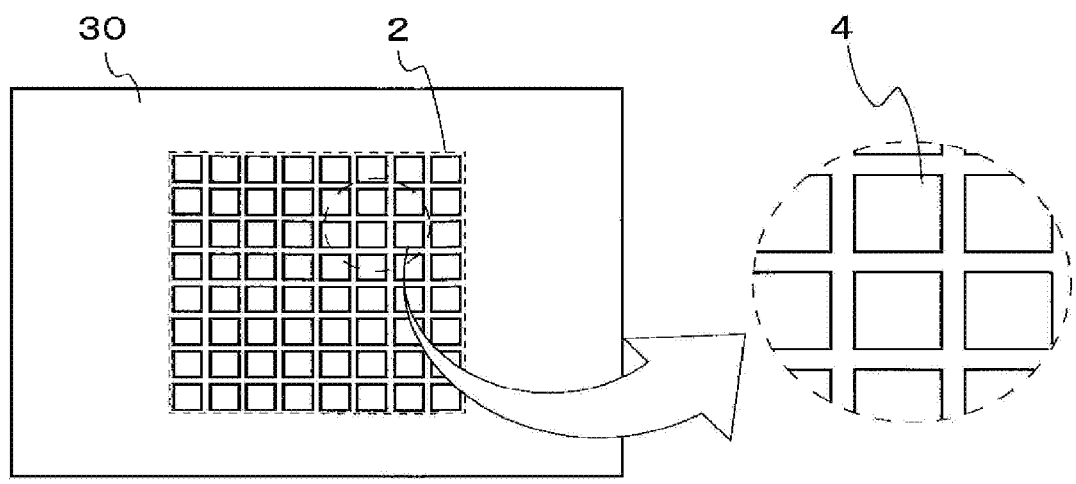

FIGS. 3(*a*)-4(*b*) are, respectively, a plan view showing a modification of the microstructure 4. The microstructure 4 may have structures other than the continuous linear structure wherein a plurality of protrusions are formed parallel to one another at a given interval as shown in FIGS. 1, 2. Besides, the microstructure 4 may have such structures that at least one protruded or recessed portion of a continuous linear, discontinuous linear or point-like form is formed plurally. For example, there may be formed discontinuous linear protrusions (FIGS. 3(*a*) and 3(*b*)), point-like protrusions (FIG. 3(*c*)), and discontinuous linear and point-like protrusions (FIG. 4(*a*)). The patterns of such microstructures 4 may be formed in a wide variety of ways depending on the output power, scanning trace and the like of a laser beam when the beam is irradiated while scanning. Alternatively, the microstructure may have a structure wherein planar geometry units such as of a rectangular form may be arranged as shown in FIG. 4(*b*). Such a structure can be formed by appropriately setting the spot diameter and spot shape of a laser beam and planarly irradiating the laser beam. The geometry units may include, aside from a rectangular form, a triangular form, a circular form, a band-shaped form and the like arbitrary forms.

Figure 5:
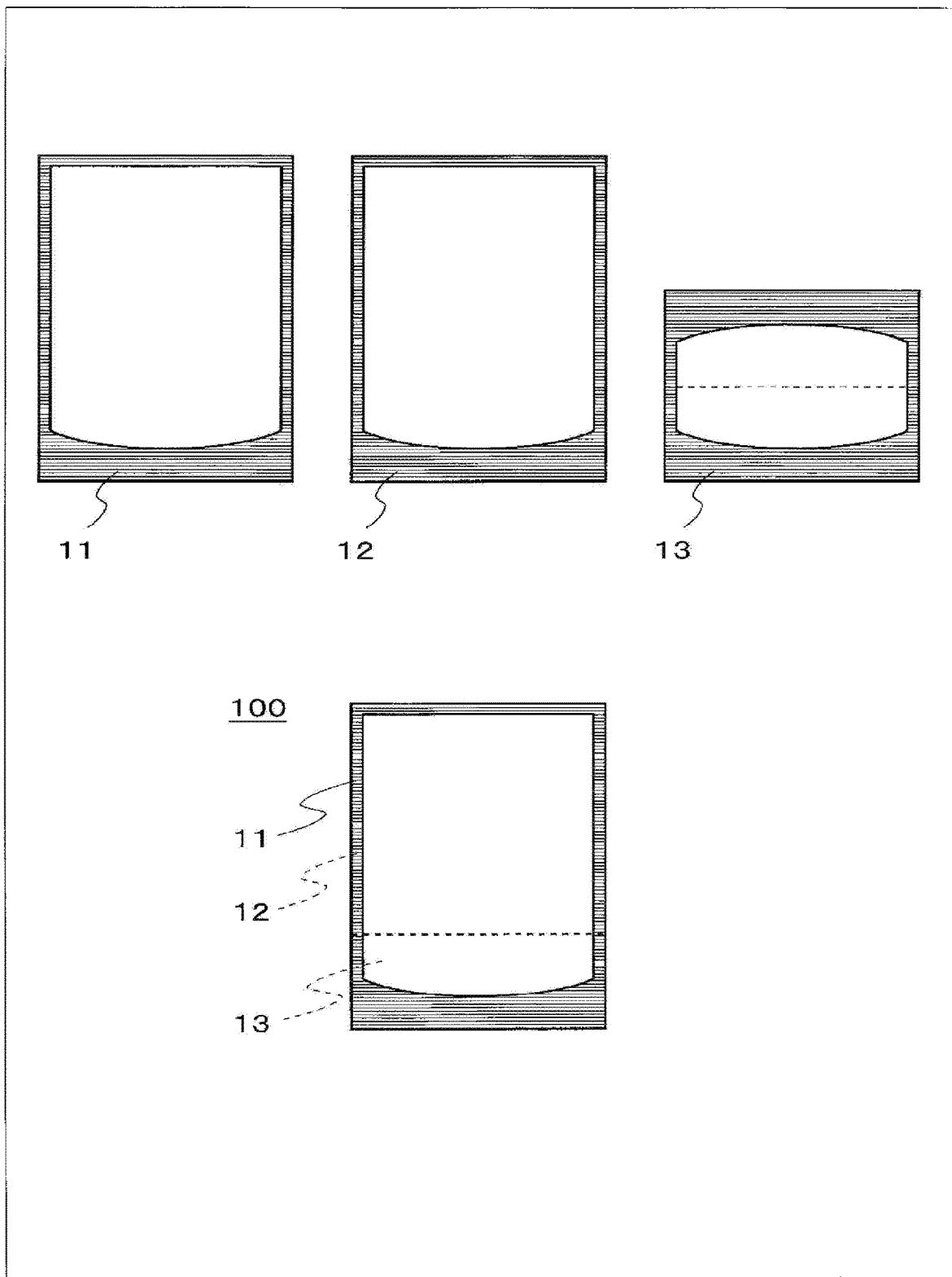
FIG. 5 is a plan view showing a produced film and a packaging pouch.

When using the film imparted with the heat sealability according to the method related to the first embodiment, a packaging container can be produced. The method for producing a packaging container includes the steps of imparting heat sealability to one or more films and heat sealing mutual regions of the one or more films imparted with the heat sealability. In FIG. 5, examples of films and a packaging container are shown. Films 11, 12 and 13, respectively, have peripheral portions shown as hatched, which are imparted with heat sealability by the method according to an embodiment of the invention. The film 13 folded in the middle is sandwiched between the films 11, 12, followed by heat sealing to produce a packaging pouch 100. The packaging container is not limited to the packaging container 100, and a variety of configurations using one ore more films can be possible. Since such a packaging container makes use of a polyester that is excellent in heat and chemical resistances and aroma retentivity, its content can be favorably accommodated.

For example, when an opening portion of a cup-shaped container body such as of a resin is sealed with a film 10, a packaging container can be produced. The sealing is carried out, for example, by heat sealing the whole periphery of a flange formed at the opening end of the container body and the film 10.

Figure 6:
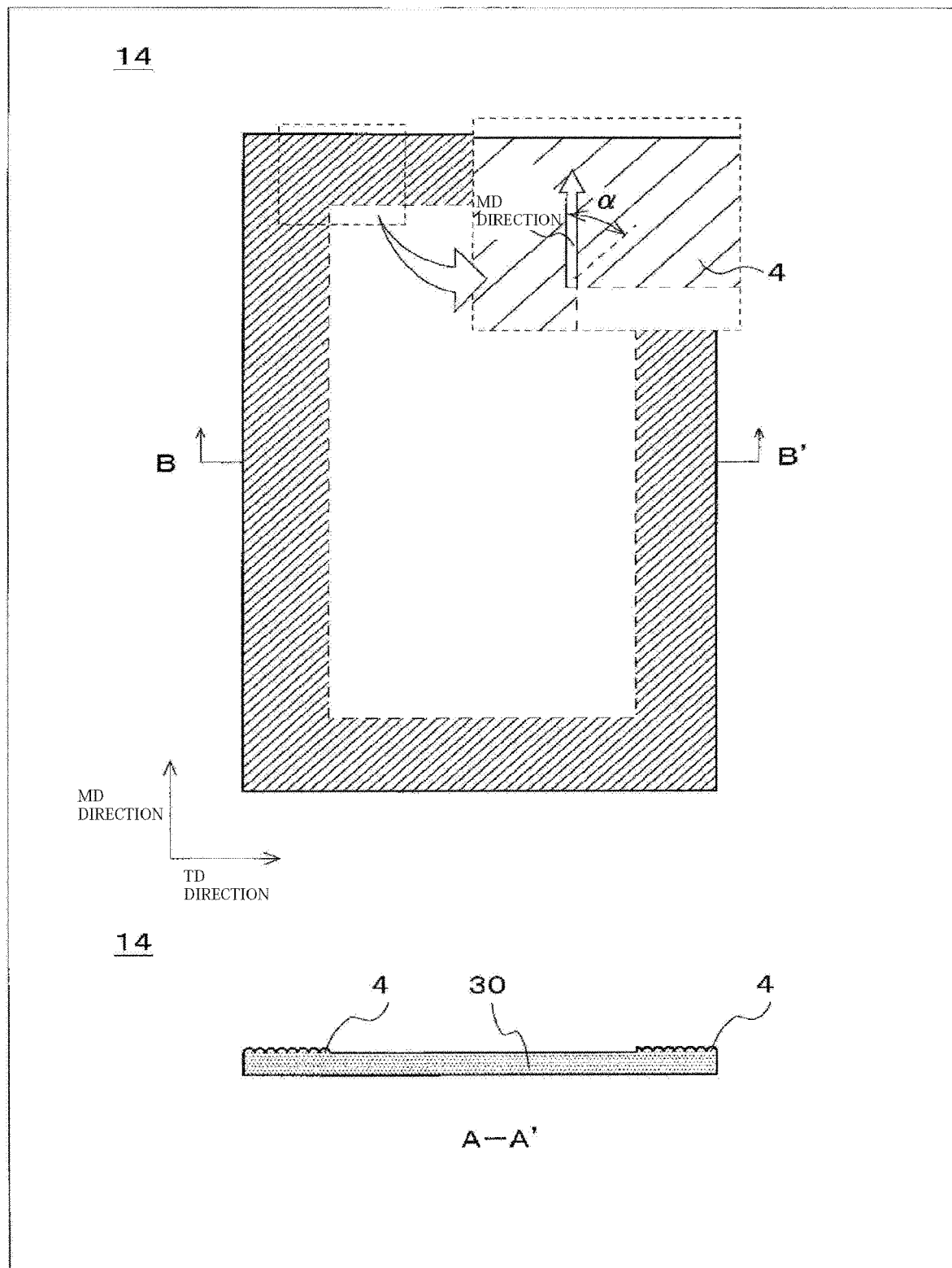
FIG. 6 is a plan view and a sectional view showing a further modification of microstructure.

FIG. 6 is a plan view and a sectional view of another modification of the microstructure 4. A film 14 is made, for example, of a single PET layer 30 of a rectangular form. The film 14 is formed, at the peripheral regions of one surface thereof, with a plurality of microstructures 4 imparted with heat sealability by irradiation of a laser beam. The microstructure 4, which is shown as enlarged in FIG. 6, is in a linear pattern whose lines are each at an angle of a relative to the MD direction (i.e. the flow direction of the film; in vertical directions to the plane of the figure). The angle α preferably ranges from 5° to 85°. An angle of 45° is more preferred, which is exactly made equal relative to both the MD direction and the TD direction vertical thereto.

Figure 7:
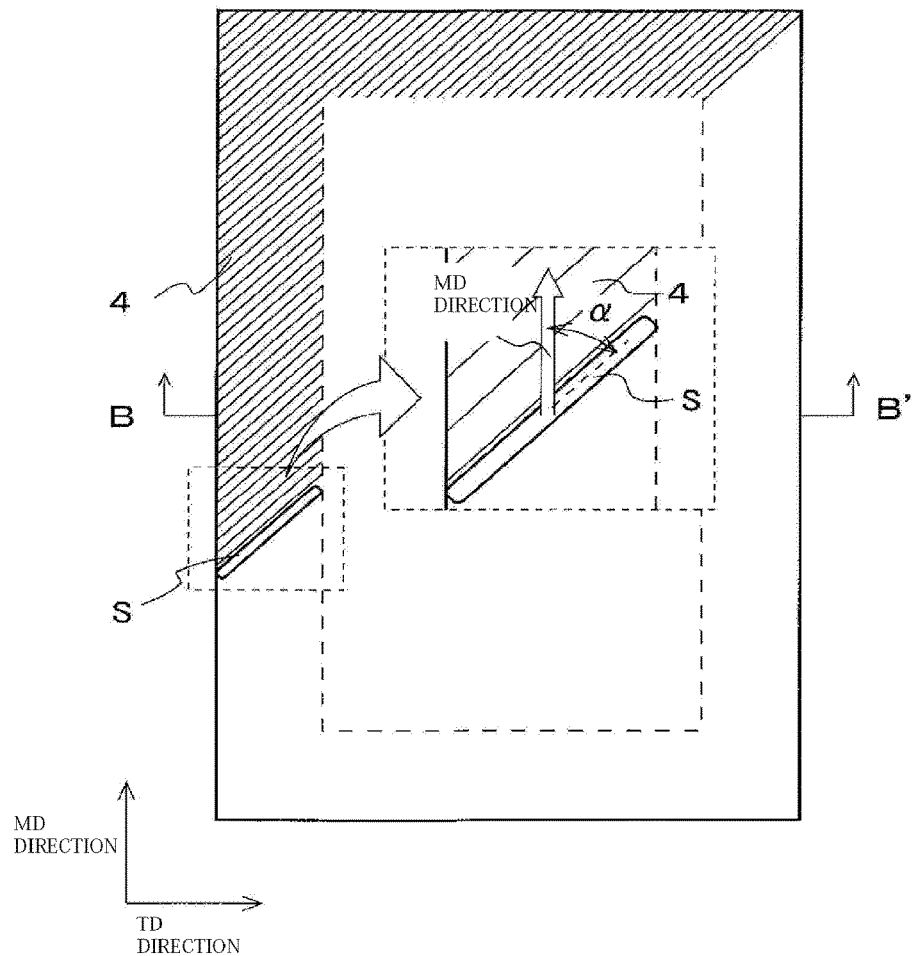
FIG. 7 is a plan view and a sectional view showing impartment of heat sealability related to an embodiment.
Figure 7:
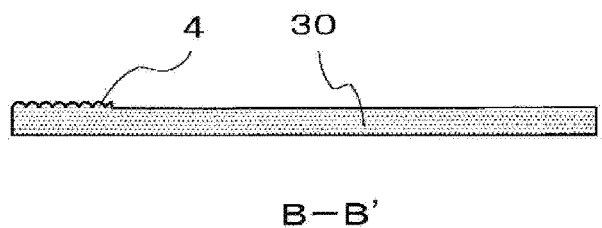

FIG. 7 is a view illustrating a method of imparting heat sealability to the film 14. In this modification, the irradiation shape of a laser beam used in place of the spot is a linear irradiation pattern S whose line has a given length, and the laser beam is irradiated while moving along the peripheral regions. The drawing direction of the irradiation pattern S is made at such an angle α as indicated above relative to the MD direction of the film 10. A plurality of the microstructures 4 are formed on the regions by the irradiation in the irradiation pattern S. The irradiation of the laser beam may be effected either intermittently or continuously. With the case of the continuous irradiation, similar microstructures 4 can be formed by periodically changing various characteristics of the laser beam such as an output power and the like.

Figure 8:
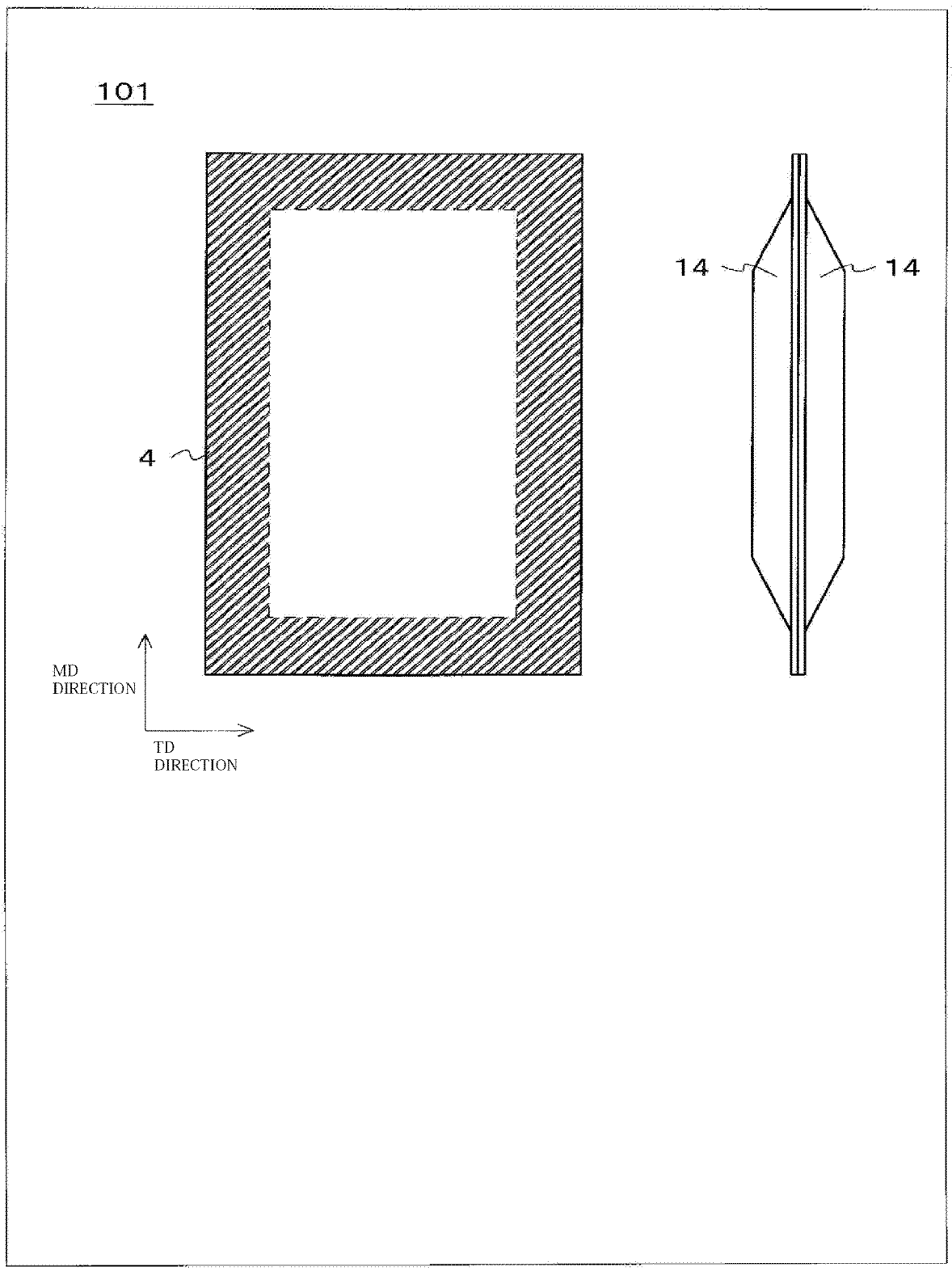
FIG. 8 is a plant view and a sectional view of a produced packaging pouch.

FIG. 8 is a plan view and a side view of a packaging container 101 using the film 14. The packaging container 101 is a four-side sealed pouch, which is produced by superposing two films 14 in such a way that the surfaces irradiated with a laser beam are in face-to-face relation, followed by heat sealing the peripheral portions thereof to form an accommodation portion. Such a packaging container usually is such that the respective end edges of the packaging container and the respective end edges of the accommodation portion are parallel to either of the MD direction or TD direction.

Generally, with a linear heat-sealed portion, sealed strength in the case that peeling is carried out along the lengthwise direction of the linear form is smaller than sealed strength in the case that peeling is carried out in a direction vertical to the lengthwise direction. Accordingly, where the drawing direction of the linear microstructure 4 is made parallel to the MD direction or TD direction, a difference is made in seal peeling strength between the respective end edges of the packaging container 101 and also between the respective end edges of the accommodation portion in such a way that seal strength in any of the end edges becomes smaller than seal strength in an adjacent end edge, thereby causing the seal strength to have directionality.

In the present modification, since the packaging container 101 is formed such that the drawing direction of the linear microstructure 4 is made at an angle α of not less than 5° to 85° relative to the MD direction, a difference in seal strength between the MD and TD directions can be made small, thereby enabling uniform and satisfactory seal strength to be stably imparted in all directions. It will be noted that when using such an irradiation method of a laser beam as stated above, similar effects may be obtained if microstructures 4 having a pattern corresponding to the irradiation pattern S is not always formed.

The shape of the packaging container 101 is not limited to the four side sealed pouch, arbitrary shapes may be adopted so far as at least a part of the outer end edges or inner end edges of the accommodation portion is parallel to the MD direction or TD direction. For instance, there can be adopted a three side sealed pouch that is formed by heat sealing facing peripheral edges of one film folded in the middle, or the packaging container shown in FIG. 5.

Second Embodiment

Figure 9:
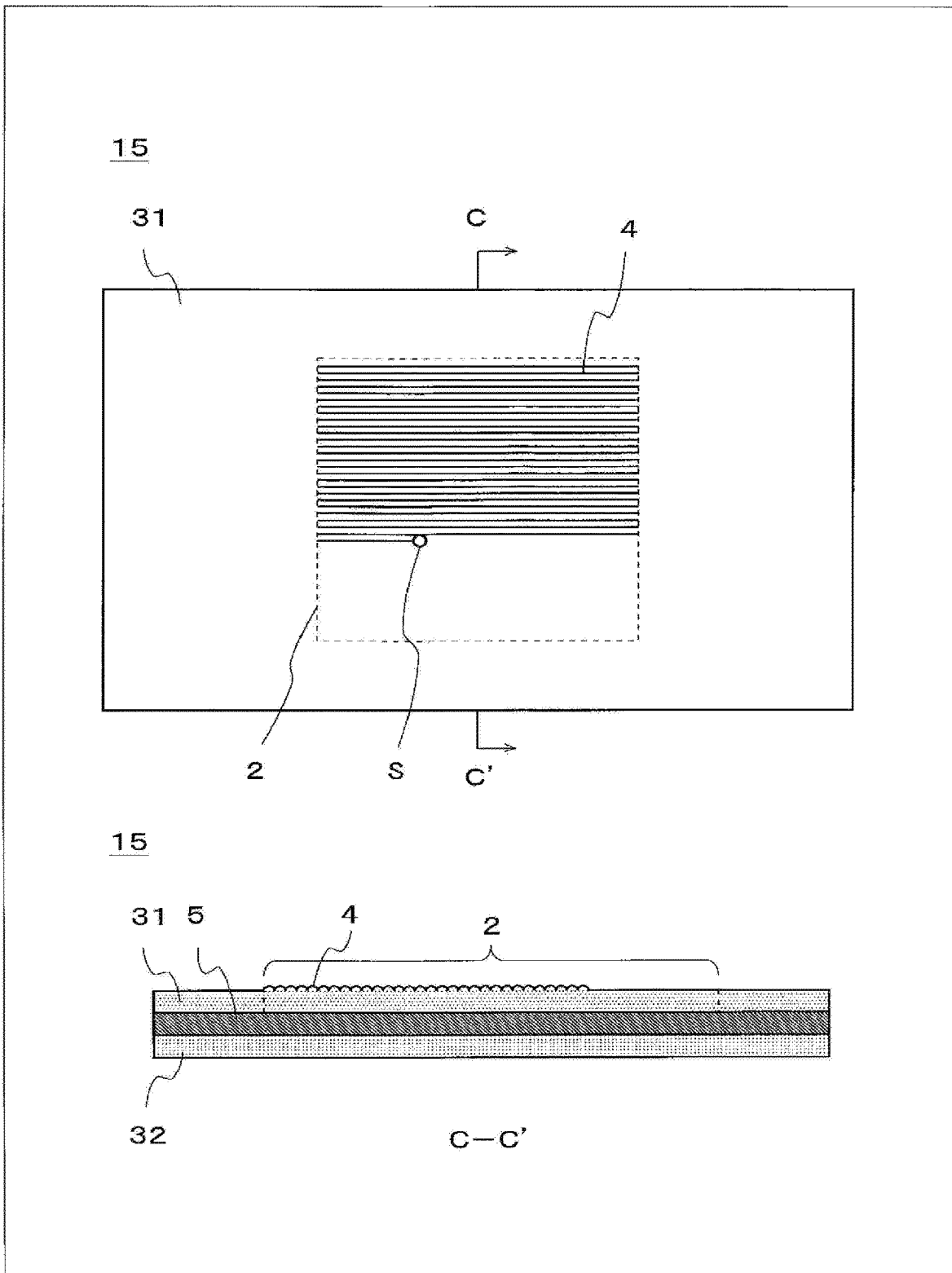
FIG. 9 is a plan view and a sectional view showing a method of imparting heat sealability related to an embodiment.

FIG. 9 is a view illustrating a method related to the second embodiment. In FIG. 9, there are shown a plan view of a film 15 made, for example, of a laminate including a PET layer on opposite surfaces (front and back surfaces) and a sectional view taken along the line C-C' of the plan view. The film 15 includes an aluminum layer 5 stacked between two PET layers 31, 32 and reflecting a laser beam. Illustrations of like members as in the first embodiment are appropriately omitted.

Figure 10:
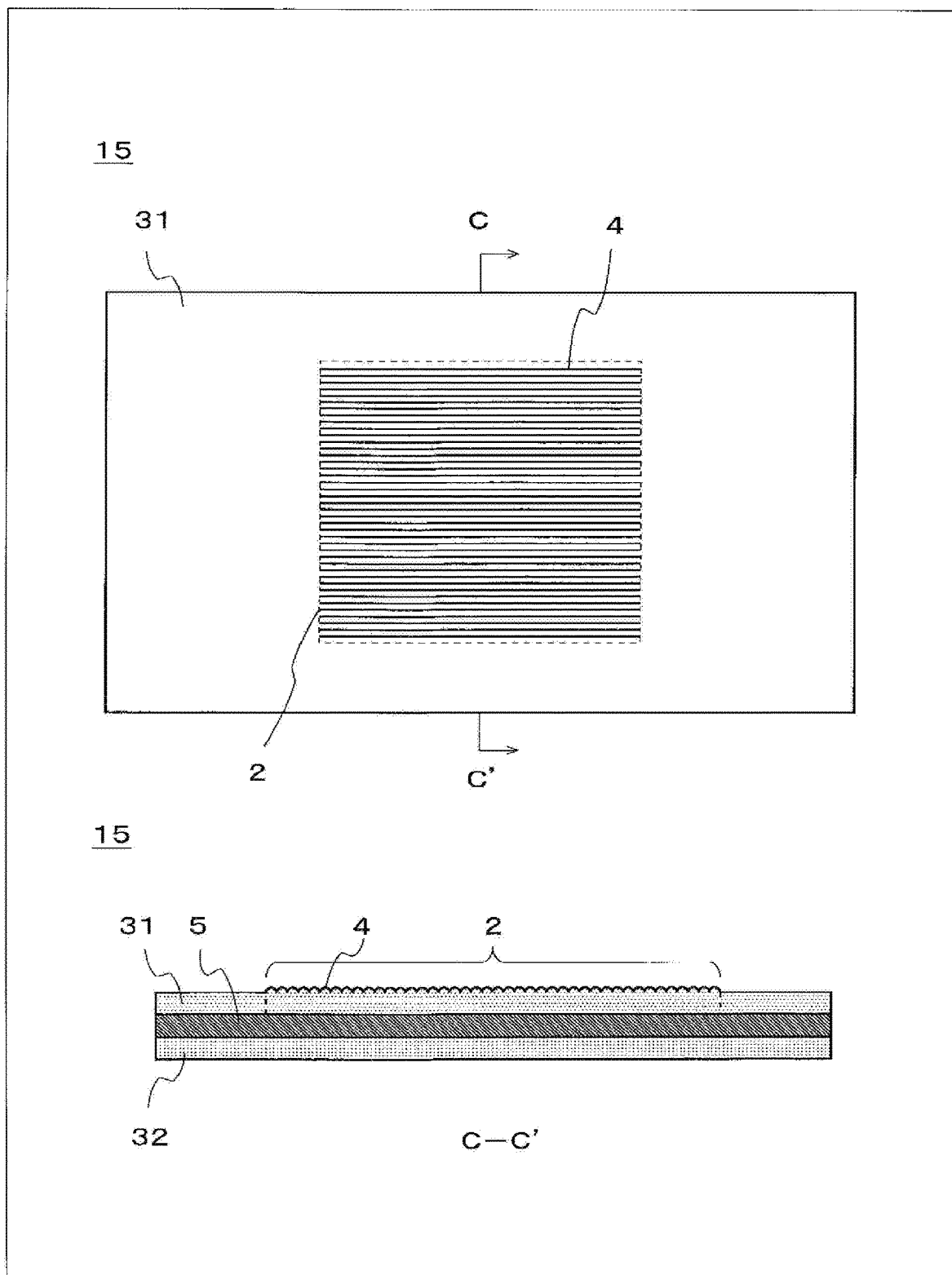
FIG. 10 is a plan view and a sectional view of a film related to an embodiment.

In the present embodiment, a laser beam is irradiated over the PET layer 31 on one surface of the film 15 to impart heat sealability thereto, but not to impart the heat sealability to the PET layer 32 on the opposite side. In FIG. 10, there are shown a plan view and a sectional view of the film 15 that has been imparted with the heat sealability.

The aluminum layer 5 is a layer formed by using, for example, an about 9 μm thick aluminum foil and has the function of blocking a laser beam and preventing the PET films 31, 32 from not being kept in the state of film due to the melting and shrinkage thereof.

In general, where biaxially oriented polyethylene terephthalate is in the form of a relatively thin, single film having a thickness, for example, of not larger than about 20 μm, it is liable that a difficulty is involved in keeping the state of film when irradiated portions are molten and shrunk due to the temperature rise resulting from the irradiation of a laser beam. However, the lamination of the aluminum layer 5 can suppress the shrinkage of the PET layer 31 irradiated with a laser beam. The aluminum layer 5 reflects the laser beam, so that the temperature rise is more unlikely to occur than with the case of black materials absorbing a laser beam. Thus, the provision of the aluminum layer 5 can prevent the PET layers 31, 32 from being heated more than necessary. The aluminum layer 5 blocks a laser beam, so that the PET layer at the side opposite to the irradiation side of the laser beam is not changed in quality. Hence, heat sealability can be imparted only to one side of the film 15.

With the film 15, the PET layers 31, 32 are formed directly formed on opposite surfaces of the aluminum layer 5. Moreover, at least one resin layer, such as polyethylene or the like, which permits easy transmission of a laser beam and is resistant to heating, may be included between the aluminum layer 5 and the PET layer 31 or 32, or in place of the aluminum layer 5. Although aluminum is used as a material for the layer reflecting a laser beam, other types of materials capable of reflecting a laser beam may be appropriately used.

In this way, according to the method of the second embodiment, a laser beam is irradiated under scanning to a given region of the film 15 that is made of a laminate including the aluminum layer 5 capable of reflecting the laser beam and stacked between the two PET layers 31, 32, heat sealability can be imparted to the given portion of one PET layer 31 while preventing melting, shrinkage and the like by the irradiation of the laser beam.

Third Embodiment

Figure 11:
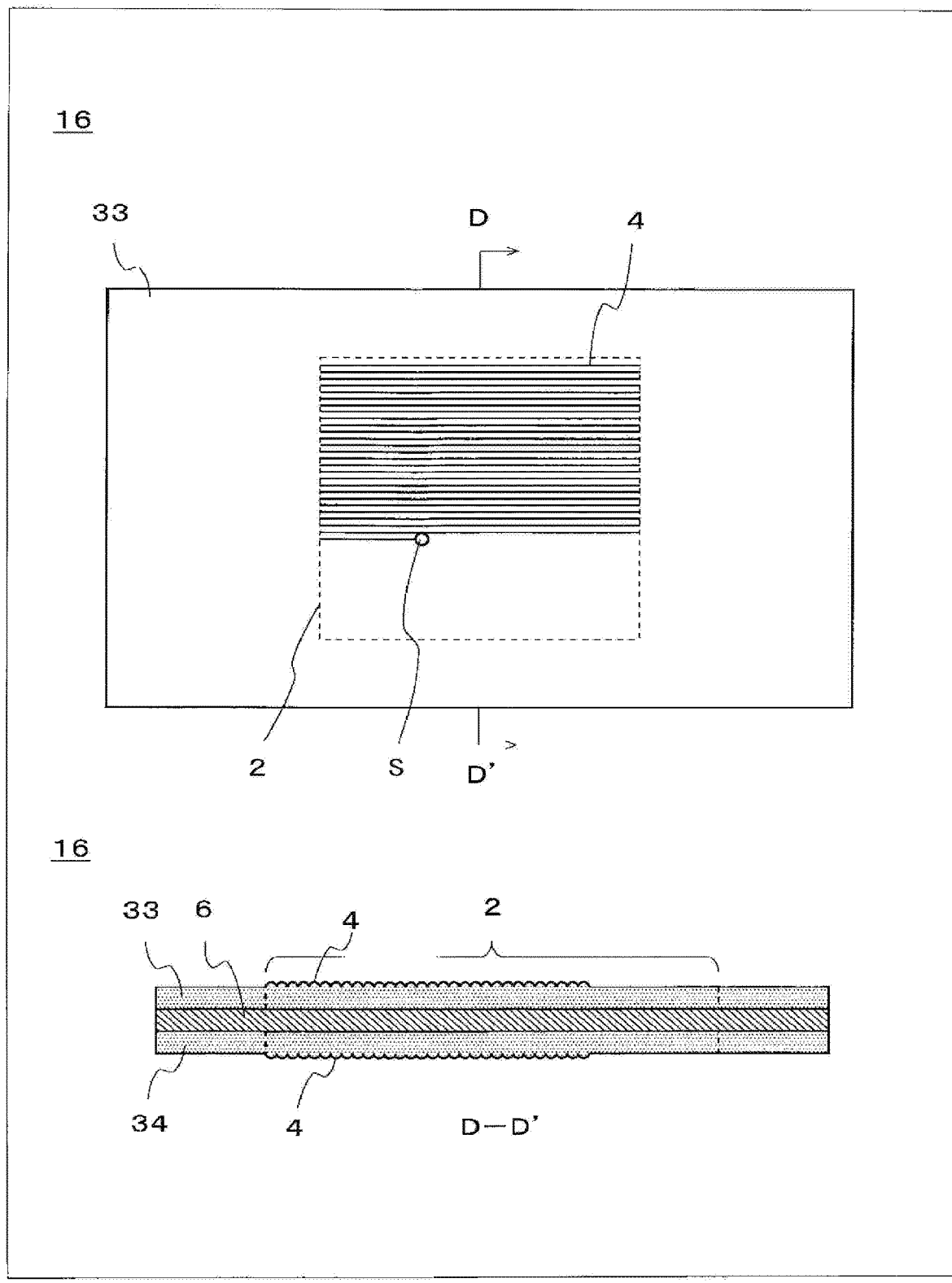
FIG. 11 is a plan view and a sectional view showing a method of imparting heat sealability related to an embodiment.

FIG. 11 is a view illustrating a method related to the third embodiment. In FIG. 11, there are shown a plan view of a film 16 made of a laminate, which includes, for example, PET layers 34, 35 on opposite surfaces (front and back surfaces) and a polyethylene layer 6 (hereinafter referred to as PE layer 6), which is a kind of polyolefin resin capable of readily transmitting a laser beam and provided between the PET layers 34, 35, and also a sectional view taken along the D-D' line of the plan view. Illustrations of similar members as in the first embodiment are appropriately omitted.

In this embodiment, a laser beam is irradiated from the side of the PET layer 33 on one surface of the film 16 to impart heat sealability to both of the PET layers 33, 34.

The laser beam irradiated to the film 16 is transmitted through the PET layer 33, followed by irradiation through the PE layer 6 to the PET layer 34 stacked on the surface opposite to the PET layer 33. As a result, the PET layer 34 is changed in quality like the PET layer 33 as is particularly shown in the sectional view of FIG. 5 thereby forming a microstructure 4 and thus developing heat sealability.

In this way, according to the method of the third embodiment, when a laser beam is irradiated under scanning to a region 2 of the film 16, the regions 2 of the PET layers 33, 34 on one and opposite surface sides thereof are imparted with heat sealability. It will be noted that in the present embodiment, although the PE layer 6 is provided, other type of thermoplastic resin such as polypropylene may appropriately used so far as there are used materials that permit easy transmission of a laser beam and are insusceptible to its influence. Additionally, a plurality of resin layers may be provided.

Fourth Embodiment

Figure 12:
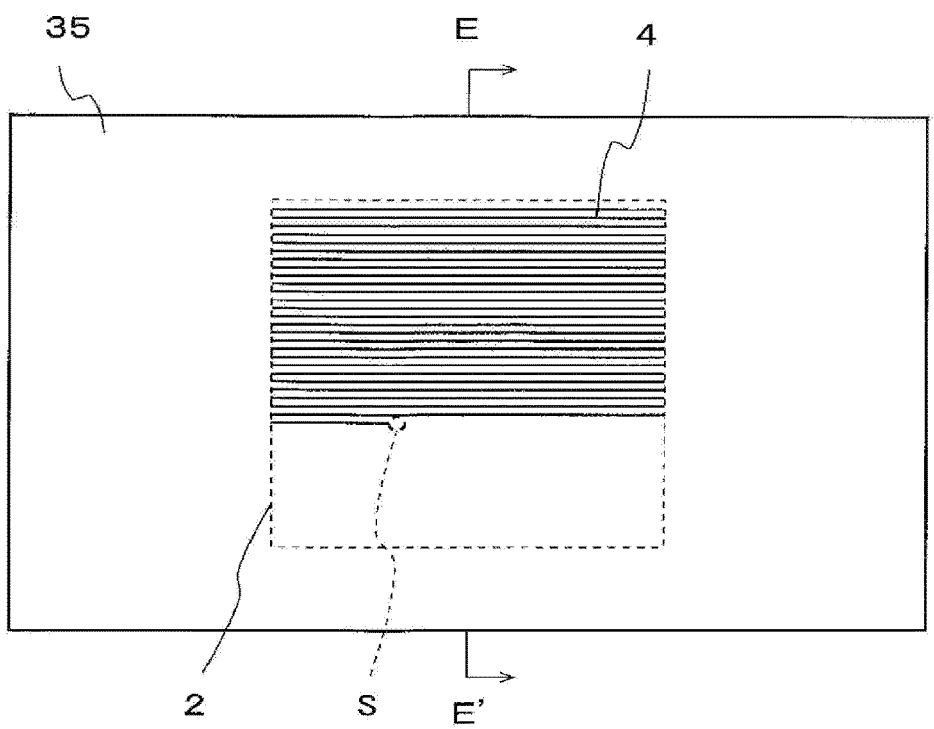
FIG. 12 is a plan view and a sectional view showing a method of imparting heat sealability related to an embodiment.
Figure 12:
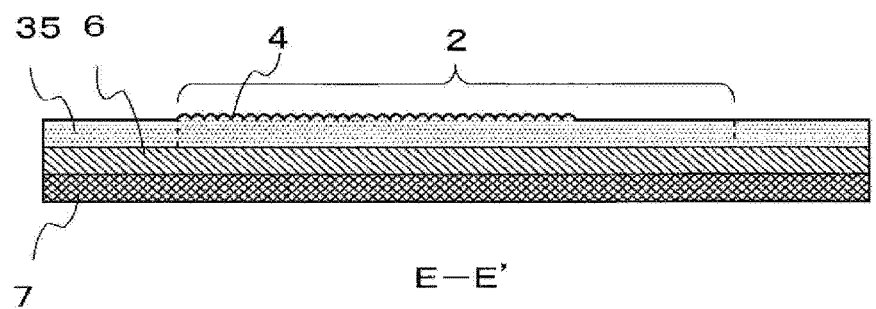

FIG. 12 is a view illustrating a method related to the fourth embodiment. In FIG. 12, there are shown a plan view of a film 17 made of a laminate including, for example, an oriented polypropylene layer (OPP layer) 7, a PE layer 6, and a PET layer 35 in this order and a sectional view taken along the E-E' line of the plan view. Illustrations of like members as in the first embodiment are appropriately omitted.

In the present embodiment, a laser beam is irradiated from the side of the OPP layer 7 opposite to a side on which the PET layer 35 is stacked, and the PET layer 35 is imparted with heat sealability by the laser beam transmitted through the OPP layer 7 and the PE layer 6.

In this way, according to the method of the present embodiment, a laser beam is irradiated under scanning to a region 2 of the film 17 stacking the PET layer 35 as one surface thereof from other surface side thereby imparting heat sealability to the PET layer 35. It will be noted that although the OPP layer 7 and the PE layer 6 are provided in this embodiment, other types of resin materials that permit easy transmission of a laser beam and are insusceptible to its influence can be appropriately used. In addition, three or more resin layers may be provided.

EXAMPLES

Evaluation 1

Films of Examples 1-1 to 1-5 and Comparative Example 1-1, which were made of a single biaxially oriented polymer layer or laminates including a biaxially oriented polyester layer on a surface thereof, were prepared and subjected to heat sealing, followed by measurement of seal strength.

Example 1-1

A film related to this example was a 50 μm thick film made of biaxially oriented polyethylene terephthalate alone. Using a carbon dioxide gas laser device ML-Z9510, manufactured by Keyence Corporation, a laser beam having an output power of 21 W was irradiated to the film. The irradiation region had an area of 100 mm×100 mm, and scanning was carried out under conditions of an irradiation spot having a diameter of 0.14 mm and a scanning speed of 4000 mm/second in the form of a plurality of parallel lines at a scanning interval of 0.1 mm. The regions irradiated in this way were mutually heat sealed by application of heat and pressure of a temperature of 140° C. and a pressure of 0.2 MPa for 2 seconds, followed by measurement of seal strength. As a result, it was confirmed that the seal strength was 22 N/15 mm and thus, heat sealability were imparted. In order to confirm the presence or absence of the orientation characteristics, when chloroform was dropped over the irradiated region, the dropped region was bleached (or opaqued), thus revealing that the biaxial orientation disappeared.

Example 1-2

A film related to this example was one which was made of a laminate having a layer configuration of polyethylene terephthalate (12 μm in thickness)/aluminum (9 μm in thickness)/polyethylene (20 μm in thickness)/biaxially oriented polyethylene terephthalate (12 μm in thickness). This film was subjected to laser beam irradiation using the same device and conditions as in Example 1-1 from the side of the biaxially oriented polyethylene terephthalate. As to the scanning speed and scanning interval, the laser beam irradiation was carried out under different conditions from those of Example 1-1. The regions irradiated with the laser beam were mutually heat sealed under the same conditions as in Example 1-1. The results of measurement of the seal strength are shown in Table 1. Although heat sealability was confirmed in any cases, it could be revealed that the case of a scanning speed of 4000 mm/second and a scanning interval of 0.2 mm or below, or the case of scanning interval of 0.05 mm and a scanning speed of 4000 mm/second or over, respectively, showed much larger seal strength and thus, heat sealability were conveniently imparted. It is considered that if the scanning speed or scanning interval is too great, an irradiation energy of the laser beam becomes so small at the respective portions that the quality change of the surface becomes insufficient. If the scanning speed is too small, an irradiation energy of the laser beams at the respective portions becomes so great that the biaxially oriented polyethylene terephthalate is caused to disappear by evaporation, burning (oxidation) or the like. In order to confirm the presence or absence of orientation characteristics, chloroform was dropped with the result that the dropped portion was bleached (opaqued), thus revealing that the biaxial orientation disappeared.

TABLE 1

| | | Scanning interval (mm) and seal strength (N/15 mm) | | | |
|---|---|---|---|---|---|
| | | 0.3 | 0.2 | 0.1 | 0.05 |
| Scanning speed (mm/second) | 8000 | 3.1 | 2.0 | 3.5 | 20.1 |
| | 6000 | 3.7 | 4.1 | 15.0 | 21.4 |
| | 4000 | 4.05 | 14.85 | 22.6 | 22.0 |
| | 2000 | 7.2 | 7.5 | 5.25 | 3.0 |
| | 1000 | 7.05 | 3.6 | 2.4 | 2.7 |
| | 500 | 2.4 | 3.9 | 4.5 | 2.25 |

Example 1-3

A film related to this example was one which was made of a laminate having a layer configuration of oriented polypropylene (20 μm in thickness)/low density polyethylene (30 μm in thickness)/biaxially oriented polyethylene terephthalate (12 μm in thickness). This film was subjected to laser beam irradiation on the back surface thereof using the same device and conditions as in Example 1-1. The back surface regions irradiated with the laser beam were mutually heat sealed under the same conditions as in Example 1-1.

The results of measurement of seal strength of the heat sealed regions revealed that the seal strength was not less than 10 N/15 mm.

Example 1-4

A film related to this example was one which was made of a laminate having a layer configuration of first biaxially oriented polyethylene terephthalate (12 μm in thickness)/middle density polyethylene (50 μm in thickness)/second biaxially oriented polyethylene terephthalate (12 μm in thickness). This film was subjected to laser beam irradiation using the same device and conditions as in Example 1-1 from the side of the first biaxially oriented polyethylene terephthalate. On this occasion, the laser beam was arrived at the second axially oriented polyethylene terephthalate through the middle density polyethylene. The regions of the first biaxially oriented polyethylene terephthalate, which was the irradiation surface of the laser beam, were heat sealed under the same conditions as in Example 1-1. Moreover, the regions of the second biaxially oriented polyethylene terephthalate were also mutually heat sealed under the same conditions as in Example 1-1. The results of measurement of seal strength of the heat sealed regions revealed that the seal strength was not less than 10 N/15 mm for both the laser beam irradiated surface and the laser beam non-irradiated surface.

Example 1-5

A film related to this example had a layer configuration similar to the film of Example 1-3. This film was subjected to laser beam irradiation under the same device and conditions as in Example 1-1 from a side of the oriented polypropylene layer unlike Example 1-3. On this occasion, the laser beam arrived at the biaxially oriented polyethylene terephthalate on the back surface through the respective layers of the oriented polypropylene and low-density polyethylene. The regions on the back surface irradiated with the laser beam were mutually heat sealed under the same conditions as in Example 1-1. As a result of measurement of seal strength of the heat-sealed regions, it could be confirmed that the seal strength was not less than 10 N/15 mm.

Comparative Example 1-1

A film related to this comparative example was a 12 μm thick film made of biaxially oriented polyethylene terephthalate alone. This film was subjected to laser beam irradiation under the same device and conditions as in Examples 1-1. As a result of the irradiation of a laser beam, the irradiated region of the film was molten and shrunk, thereby not enabling keeping the film morphology. The thickness of the film was smaller than that of Example 1-1 and was the same as the thickness of the biaxially oriented polyethylene phthalate layer of Examples 1-2 to 1-5. Even when using a film wherein the biaxially oriented polyethylene terephthalate layer was so thin that the film state was unlikely to be maintained, good heat sealability could be imparted when formed as a laminate.

Evaluation 2

Films of Examples 2-1 to 2-5 and Comparative Examples 2-1 to 2-5 were prepared and heat sealed, followed by measurement of seal strength. In Table 2, there are shown physical values of biaxially oriented polyester films 1 to 7, which were used for the preparation of the respective films and on which a microstructure was to be formed. The biaxially oriented polyester films 1 to 5 satisfy such conditions of physical values of melting point, thermal shrinkage rate, Young's modulus and breaking strength as defined before, and the biaxially oriented polyester films 6, 7 satisfy none of such conditions of the physical values. The polyester used for all of the biaxially oriented polyester films 1 to 7 was polyethylene terephthalate.

TABLE 2

|  | Melting point (° C.) | Thermal shrinkage rate (%) | Young's modulus (GPa) | Breaking strength (MPa) |
| --- | --- | --- | --- | --- |
| Biaxially oriented polyester film 1 | 263 | 1.3 | 9.5 | 480.0 |
| Biaxially oriented polyester film 2 | 250 | 1.6 | 10.0 | 490.0 |
| Biaxially oriented polyester film 3 | 264 | 1.5 | 9.5 | 480.0 |
| Biaxially oriented polyester film 4 | 270 | 0.5 | 12.0 | 540.0 |
| Biaxially oriented polyester film 5 | 225 | 2.0 | 8.0 | 200.0 |
| Biaxially oriented polyester film 6 | 220 | 2.1 | 7.0 | 190.0 |
| Biaxially oriented polyester film 7 | 275 | 0.4 | 12.2 | 550.0 |

These films were subjected to laser beam irradiation using the same device and conditions as in Example 1-1. The regions irradiated with the laser beam were mutually heat sealed under the same conditions as in Example 1-1. Thereafter, the seal strength of the heat-sealed regions was measured.

Example 2-1

Films related to this example were each a single-layer biaxially oriented polyester film having a thickness of 50 μm. The laser beam irradiation was carried out to form a microstructure on one surface. When using the biaxially oriented polyester films 1 to 5, it was confirmed that seal strengths were not less than 3 N/15 mm (3 to 23 N/15 mm). Thus, the development of heat sealability could be confirmed for all the films.

Example 2-2

Films related to this example were those films each made of a laminate having a layer configuration of biaxially oriented polyethylene terephthalate (12 μm in thickness)/aluminum (9 μm in thickness)/biaxially oriented polyester film (12 μm in thickness). The laser beam irradiation was carried out from a side of the biaxially oriented polyester film to form a microstructure on the biaxially polyester film. When using the biaxially oriented polyester films 1-5, seal strengths of not less than 3 N/15 mm were confirmed and thus, the development of heat sealability could be confirmed for all the films. In Table 3, seal strengths are shown in the case where the biaxially oriented polyester films 1 to 5 were used in this example.

TABLE 3

|  |  | Seal strength (N/15 mm) |
| --- | --- | --- |
| Example 2-2 | Biaxially oriented polyester film 1 | Not less than 10 |

TABLE 3-continued

| | Seal strength (N/15 mm) |
|---|---|
| Biaxially oriented polyester film 2 | Not less than 8 |
| Biaxially oriented polyester film 3 | Not less than 5 |
| Biaxially oriented polyester film 4 | Not less than 3 |
| Biaxially oriented polyester film 5 | Not less than 3 |

Example 2-3

Films related to this example were each made of a laminate having a layer configuration of biaxially oriented polyethylene terephthalate (12 μm in thickness)/aluminum (9 μm in thickness)/polyethylene (20 μm in thickness)/biaxially oriented polyester film (12 μm in thickness). Laser beam irradiation was carried out from a side of the biaxially oriented polyester film to form a microstructure on the biaxially oriented polyester film. When using the biaxially oriented polyester films 1 to 5, it was confirmed that seal strengths were, respectively, not less than 3 N/15 mm (3 to 23 N/15 mm). Thus, the development of heat sealability could be confirmed for all the films.

Example 2-4

Films related to this example were each made of a laminate having a layer configuration of biaxially oriented polyester film (12 μm in thickness)/middle density polyethylene (50 μm in thickness)/biaxially oriented polyester film (12 μm in thickness). Laser beam irradiation was carried out from one surface side to form a microstructure simultaneously on the biaxially oriented polyester films on the both sides, respectively. The biaxially oriented polyester films on the opposite surfaces were made of the same film. When using the biaxially oriented polyester films 1 to 5, seal strengths of not less than 3 N/15 mm (3 to 23 N/15 mm) were confirmed for mutual regions on each of the front and back sides. Thus, the development of heat sealability could be confirmed.

Example 2-5

Films related to this example were each made of a laminate having a layer configuration of oriented polypropylene (20 μm in thickness)/low density polyethylene (30 μm in thickness)/biaxially oriented polyester film (12 μm in thickness). Where the biaxially oriented polyester films 1 to 5 were, respectively, used and laser beam irradiation was carried out from the side of the biaxially polyester film to form a microstructure on the biaxially oriented polyester film, seal strengths of not less than 3 N/15 mm (3 to 23 N/15 mm) were confirmed and thus, the development of heat sealability could be confirmed for all the films. Moreover, where the biaxially oriented polyester films 1 to 5 were, respectively, used and laser beam irradiation was carried out from the side of the oriented polypropylene to form a microstructure on the biaxially oriented polyester film, seal strengths of not less than 3 N/15 mm (3 to 23 N/15 mm) were confirmed and thus, the development of heat sealability could be confirmed.

Comparative Examples 2-1 to 2-5

Comparative Examples 2-1 to 2-5 were directed to films, which were obtained by using the biaxially oriented films 6, 7 instead of the biaxially oriented polyester films 1 to 5 and also using other configurations and laser beam irradiation conditions as in Examples 2-1 to 2-5. Heat sealing was conducted in the same manner as in Examples 2-1 to 2-5. As a result, no development of heat sealability could be confirmed for either case of the biaxially oriented polyester film 6 or 7.

From the above results, it could be confirmed that the use of a biaxially oriented polyester film satisfying the such physical value conditions as defined before was preferred so as to favorably impart heat sealability to films having various layer configurations by laser beam irradiation.

Evaluation 3

In Examples 3-1 to 3-9 and Comparative Examples 3-1 to 3-6, films made of a single biaxially oriented polyester layer and laminates including a biaxially oriented polyester layer on the surface thereof were subjected to laser beam irradiation of different energies and heat sealed, followed by measurement of seal strength.

Example 3-1

A film related to this example was one which was made of a laminate having a layer configuration of biaxially oriented polyethylene terephthalate (12 μm in thickness)/aluminum (9 μm in thickness)/biaxially oriented polyethylene terephthalate (12 μm in thickness). Using carbon dioxide gas laser device ML-Z9510, manufactured by Keyence Corporation, an infrared laser beam was irradiated from one surface side of the film. The irradiation energy was set at 2 J/cm$^2$. The regions at the incident side of the irradiated laser beam were mutually heat sealed for 2 seconds by application of heat and pressure at a temperature of 140° C. and a pressure of 0.2 MPa. The seal strength of a sample cut out from the heat sealed region with a width of 15 mm was measured and found to be 10 N/15 mm.

Example 3-2

This example differed from Example 3-1 only in that the irradiation energy was set at 10 J/cm$^2$. The seal strength was 15 N/15 mm.

Example 3-3

This example differed from Example 3-1 only in that the irradiation energy was set at 15 J/cm$^2$. The seal strength was 15 N/15 mm.

Example 3-4

A film related to this example was one which was made of a laminate having a layer configuration of first biaxially oriented polyethylene terephthalate (12 μm in thickness)/aluminum (9 μm in thickness)/polyethylene (20 μm in thickness)/second biaxially oriented polyethylene terephthalate (12 μm in thickness). Using the same device as in Example 3-1, an infrared laser beam was irradiated to the film from the side of the second biaxially oriented polyethylene terephthalate. The irradiation energy was set at 2 J/cm$^2$. The mutual regions at the back surface where the laser beam was irradiated were heated sealed under the same conditions as in Example 3-1. The seal strength of the heat sealed regions was measured in the same manner as in Example 3-1 and was found to be 10 N/15 mm.

Example 3-5

This example differed from Example 3-4 only in that the irradiation energy was set at 10 J/cm$^2$. The seal strength was 15 N/15 mm.

Example 3-6

This example differed from Example 3-4 only in that the irradiation energy was set at 15 J/cm$^2$. The seal strength was 15 N/15 mm.

Example 3-7

A film related to this example is a single layer film of biaxially oriented polyethylene terephthalate (50 μm in thickness). Using the same device as in Example 3-1, the film was subjected to infrared laser beam irradiation from one surface side thereof. The irradiation energy was set at 2 J/cm$^2$. The regions at the incident surface side of the irradiated laser beam were mutually heat sealed under the same conditions as in Example 3-1. The seal strength of the heat sealed regions was measured in the same manner as in Example 3-1 and was found to be 11 N/15 mm.

Example 3-8

This example differed from Example 3-7 only in that the irradiation energy was set at 10 J/cm$^2$. The seal strength was 15 N/15 mm.

Example 3-9

This example differed from Example 3-8 only in that the irradiation energy was set at 15 J/cm$^2$. The seal strength was 15 N/15 mm.

Comparative Example 3-1

This comparative example differed from Example 3-1 only in that the irradiation energy was set at 1 J/cm$^2$. The seal strength was 1 N/15 mm.

Comparative Example 3-2

This comparative example differed from Example 3-1 only in that the irradiation energy was set at 16 J/cm$^2$. The PET layer at the side irradiated with the laser beam was evaporated by application of heat and disappeared and thus, no heat sealing could be performed.

Comparative Example 3-3

This comparative example differed from Example 3-4 only in that the irradiation energy was set at 1 J/cm$^2$. The seal strength was 1 N/15 mm.

Comparative Example 3-4

This comparative example differed from Example 3-4 only in that the irradiation energy was set at 16 J/cm$^2$. The PET layer at the side irradiated with the laser beam was evaporated by application of heat and disappeared and thus, no heat sealing could be performed.

Comparative Example 3-5

This comparative example differed from Example 3-7 only in that the irradiation energy was set at 1 J/cm$^2$. The seal strength was 1 N/15 mm.

Comparative Example 3-6

This comparative example differed from Example 3-7 only in that the irradiation energy was set at 16 J/cm$^2$. The PET layer was evaporated by application of heat and disappeared and thus, no heat sealing could be performed.

The above results are summarized in the following Table 4. As shown in Table 4, it could be confirmed that satisfactory seal strengths of not less than 10 N/15 mm were obtained in the respective examples. In contrast, is could also be confirmed in the respective comparative examples that the PET layer disappeared and heat sealing could not be performed and that where the heat sealing could be performed, the seal strength was at 1 N/15 mm and thus, satisfactory seal strength could not be obtained.

TABLE 4

| | Irradiation energy (J/cm$^2$) | Seal strength (N/15 mm) |
|---|---|---|
| Example 3-1 | 2 | 10 |
| Example 3-2 | 10 | 15 |
| Example 3-3 | 15 | 15 |
| Example 3-4 | 2 | 10 |
| Example 3-5 | 10 | 15 |
| Example 3-6 | 15 | 15 |
| Example 3-7 | 2 | 11 |
| Example 3-8 | 10 | 15 |
| Example 3-9 | 15 | 15 |
| Comparative Example 3-1 | 1 | 1 |
| Comparative Example 3-2 | 16 | Disappearance of PET layer |
| Comparative Example 3-3 | 1 | 1 |
| Comparative Example 3-4 | 16 | Disappearance of PET layer |
| Comparative Example 3-5 | 1 | 1 |
| Comparative Example 3-6 | 16 | Disappearance of PET layer |

Evaluation 4

A laser beam in a linear irradiation pattern having different angles with the MD direction was irradiated on laminate films related to Examples 4-1 to 4-9 and including a biaxially oriented polyester layer on the surface thereof. The resulting films were used to make pouches as shown in FIG. 8. Seal strengths of the respective films in the MD and TD directions were measured.

The respective laminate films had a layer configuration of biaxially oriented polyethylene terephthalate (12 μm)/aluminum (9 μm)/biaxially oriented polyethylene terephthalate (12 μm).

A laser beam in a linear pattern with a width of 14 mm was irradiated from a diffraction optical element to the respective laminate films by use of a pulsed laser processing apparatus with a maximum output power of 250 W under conditions of an output power of 30% and a scanning speed of 30 m/minute to form linear processed traces forming angles with the MD direction thereby providing seal portions.

The respective laminate films having subjected to the laser processing were heat sealed by application of heat and a load of 140° C. and 0.2 MPa for 2 seconds, followed by measurement of seal strengths in the MD and TD directions by means of a tensile tester.

In Table 5, there are shown an angle)(° of the processed trace of each laminate film with the MD direction, the seal strengths (N/15 mm) in the MD and TD directions, and the results of evaluation of the stability of the seal strengths. The results of the evaluation are such that the case that no difference in the seal strength between the MD and TD directions is indicated as "++", the case that the difference is less than 30% is indicated as "+", and the case that the difference is not less than 30% is indicated as "−".

TABLE 5

|  | Angle (°) | Seal strength (N/15 mm) | | Evaluation of seal strength stability |
| --- | --- | --- | --- | --- |
|  |  | MD direction | TD direction |  |
| Example 4-1 | 85 | 15 | 11 | + |
| Example 4-2 | 70 | 15 | 12 | + |
| Example 4-3 | 45 | 14 | 14 | ++ |
| Example 4-4 | 20 | 12 | 15 | + |
| Example 4-5 | 5 | 11 | 15 | + |
| Example 4-6 | 90 | 15 | 8 | − |
| Example 4-7 | 87 | 15 | 9 | − |
| Example 4-8 | 3 | 9 | 15 | − |
| Example 4-9 | 0 | 8 | 15 | − |

With the pouches prepared from the laminate films related to Examples 4-1 to 4-5, differences in seal strength between the MD and TD directions were all less than 30%. In view of this, it was confirmed that when an angle of the linear processed traces with the MD direction of the laminate film was set at from 5° to 85°, the seal strengths in the MD and TD directions could be made substantially equal. With respect to Examples 4-6 to 4-9, although some differences in seal strength between the MD and TD directions result, a given seal strength could be confirmed.

As stated above, according to embodiments of the invention, heat sealability can be imparted to films by a high efficiency and safety method, and packaging containers using such films can be provided.

PTL 1 describes a short pulse irradiation method. With the short pulse irradiation method described in PTL 1, high power short pulses have to be generated using a xenon lamp or the like so as not to impair the inner orientation of the biaxially oriented polyester film. Such a high power apparatus is low in energy efficiency and is difficult to ensure safety, for which there have never been made efforts toward the realization of a method using such an apparatus.

One aspect of the invention is to provide a high efficiency and safety method for imparting heat sealability to a biaxially oriented polyester film and a method for producing a packaging container using the same.

One aspect of the invention is directed to a method for imparting heat sealability to the surface of a biaxially oriented polyester layer at a given region thereof by irradiating a laser beam under scanning to the given region of a film, which is made of a single, biaxially oriented polyester layer or made of a laminate whose at least one surface includes a biaxially oriented polyester layer.

Another aspect of the invention is directed to a method for producing a packaging container, which includes the steps of imparting heat sealability to one or more films by use of the above-defined method of imparting heat sealability, and heat sealing mutually between regions of the one or more films imparted with the heat sealability.

According to an aspect of the invention, there can be provide a method for imparting heat sealability to a biaxially oriented polyester film with a high efficiency and safety and also a method for producing a packaging container using the same.

INDUSTRIAL APPLICABILITY

The embodiments of the present invention are useful in improving heat sealability of films used for packaging pouches and the like.

REFERENCE SIGNS LIST 10, 11, 12, 13, 14, 15, 16, 17 film
2 region to be imparted with heat sealability
4 microstructure
5 aluminum layer
6 polyethylene layer
7 oriented polypropylene layer 20 packaging pouch
30, 31, 32, 33, 34, 35 biaxially oriented polyethylene layer
100, 101 packaging container Obviously, numerous modifications and variations of the present invention are possible in light of the above teachings. It is therefore to be understood that within the scope of the appended claims, the invention may be practiced otherwise than as specifically described herein.

What is claimed is:

1. A method of imparting heat sealability, comprising:
applying a laser beam to a surface of a film; and
scanning the laser beam in a region on the surface of the film such that the laser beam forms a linear pattern comprising at least one microstructure in the region and that the region is imparted with heat sealability,
wherein the film is a single layer of a biaxially oriented polyester or a laminate having a biaxially oriented polyester layer on at least one surface, and the laser beam is scanned at an angle of from 5° to 85° with respect to a flow direction of the biaxially oriented polyester and is adjusted to have a radiation energy, a radiation spot diameter, a scanning trace, and a scanning speed for the film such that the laser beam forms the linear pattern comprising at least one microstructure and angled with respect to the flow direction of the biaxially oriented polyester.

2. The method of claim 1, wherein the laser beam is a pulsed beam, and a total irradiation energy of each pulse is in a range of from 0.1 J to 1 J.

3. The method of claim 2, wherein the pulsed beam is set at a maximum pulse speed in a range of from 1,000 pules/second to 500,000 pulses/second.

4. The method of claim 1, wherein the film is the laminate comprising a first biaxially oriented polyester layer on a first surface of the laminate, a second biaxially oriented polyester layer on a second surface of the laminate on an opposite side with respect to the first surface, and a thermoplastic resin layer formed between the first and second biaxially oriented polyester layers, the applying comprises applying the laser beam to the first surface, and the scanning comprises scanning the laser beam in the region on the first surface of the laminate such that the linear pattern comprising at least one microstructure is formed in the region of the first biaxially oriented polyester layer and the region of the second biaxially oriented polyester layer.

5. The method of claim 1, wherein the film is the laminate comprising a first biaxially oriented polyester layer on a first surface of the laminate and a thermoplastic resin layer on a second surface of the laminate on an opposite side with respect to the first surface, the applying comprises applying the laser beam to the second surface, and the scanning comprises scanning the laser beam in the region on the second surface such that the linear pattern comprising at least one microstructure is formed in the region of the first biaxially oriented polyester layer.

6. The method of claim 1, wherein the film is the laminate further including an aluminum layer.

7. The method of claim 1, wherein the film is the laminate further including a barrier film.

8. The method of claim 1, wherein the biaxially oriented polyester layer comprises biaxially polyethylene terephthalate.

9. The method of claim 1, wherein the laser beam is a carbon dioxide laser beam having an infrared wavelength.

10. The method of claim 1, wherein the biaxially oriented polyester layer comprises a biaxially oriented polyester having a melting point of from 225° C. to 270° C.

11. The method of claim 1, wherein the film is the single layer of the biaxially oriented polyester, and when the film is heated at 150° C. for 30 minutes, the film has a thermal shrinkage rate of from 0.5% to 2.0% in the flow direction.

12. The method of claim 1, wherein the film has a composition such that a thermal shrinkage rate in the flow direction upon heating at 150° C. for 30 minutes is from 0.5% to 2.0%.

13. The method of claim 1, wherein the film is the single layer of the biaxially oriented polyester, and the film has a sum of Young's modulus in the flow direction and Young's modulus in a direction vertical to the flow direction, which is from 8 GPa to 12 GPa.

14. The method of claim 1, wherein the film has a composition such that a sum of Young's modulus in the flow direction and Young's modulus in a direction vertical to the flow direction is from 8 GPa to 12 GPa.

15. The method of claim 1, wherein the film is the single layer of the biaxially oriented polyester, and the film has a sum of breaking strength in the flow direction and breaking strength in a direction vertical to the flow direction, which is from 200 MPa to 540 MPa.

16. The method of claim 1, wherein the film has a composition such that a sum of breaking strength in the flow direction and breaking strength in a direction vertical to the flow direction is from 200 MPa to 540 MPa.

17. The method of claim 1, wherein the irradiation energy of the laser beam is set in a range of from 2 $J/cm^2$ to 15 $J/cm^2$.

18. The method of claim 1, wherein the laser beam is scanned in the linear pattern at an angle of 45° relative to the flow direction of the biaxially oriented polyester layer.

19. A method of producing a packaging container, comprising:
    imparting heat sealability to a plurality of regions of at least one film by the method of claim 1; and
    heat-sealing the regions such that a packaging container is produced.

20. A method of producing a packaging container including a container body with an opening portion sealed by a film, comprising:
    imparting heat sealability to a region of the film according to the method of claim 1; and
    heat-sealing the region with the container body such that the packaging container including the container body with the opening portion sealed by the film is produced.

* * * * *